United States Patent
Chan et al.

(10) Patent No.: US 6,233,683 B1
(45) Date of Patent: May 15, 2001

(54) SYSTEM AND METHOD FOR A MULTI-APPLICATION SMART CARD WHICH CAN FACILITATE A POST-ISSUANCE DOWNLOAD OF AN APPLICATION ONTO THE SMART CARD

(75) Inventors: Alfred Chan, Daly City; Marc B. Kekicheff, Palo Alto; Joel M. Weise, Burlingame; David C. Wentker, San Francisco, all of CA (US)

(73) Assignee: Visa International Service Association, Foster City, CA (US)

(*) Notice: Subject to any disclaimer, the term of this patent is extended or adjusted under 35 U.S.C. 154(b) by 0 days.

(21) Appl. No.: 09/046,994

(22) Filed: Mar. 24, 1998

Related U.S. Application Data
(60) Provisional application No. 60/061,763, filed on Oct. 14, 1997, and provisional application No. 60/041,468, filed on Mar. 24, 1997.

(51) Int. Cl.[7] .................................................. G06F 1/24
(52) U.S. Cl. ........................ 713/172; 713/200; 713/201
(58) Field of Search ............................. 380/172; 713/172, 713/200, 201; 235/380

(56) References Cited

U.S. PATENT DOCUMENTS

| | | |
|---|---|---|
| 4,742,215 | 5/1988 | Daughters et al. . |
| 4,831,245 | 5/1989 | Igasawara . |
| 5,332,889 | 7/1994 | Lundstrom et al. . |
| 5,378,884 | 1/1995 | Lundstrom et al. . |
| 5,530,232 | 6/1996 | Taylor . |
| 5,583,933 | 12/1996 | Mark . |
| 5,715,431 | * 2/1998 | Everett et al. ........................ 235/492 |
| 5,901,303 | * 5/1999 | Chew ................................... 235/492 |

FOREIGN PATENT DOCUMENTS

| | | |
|---|---|---|
| 100227 | 11/1994 | (AT) . |
| 19607363 A1 | 9/1996 | (DE) . |
| 0193635 A1 | 9/1986 | (EP) . |
| 0658862 | 6/1995 | (EP) . |
| 0795844 | 9/1997 | (EP) . |
| 0798673 | 10/1997 | (EP) . |
| 98/43212 | 10/1998 | (WO) . |

OTHER PUBLICATIONS

Carol Hovenga Fancher, "In Your Pocket SmartCard", Feb. 1997, IEEE Spectrum.

(List continued on next page.)

*Primary Examiner*—Thomas R. Peeso
(74) *Attorney, Agent, or Firm*—Beyer Weaver & Thomas, LLP

(57) ABSTRACT

The embodiments of the present invention teaches a system and method which allows card issuers to securely add applications during the lifetime of the card after the card has already been issued (post issuance). The system and method according to embodiments of the present invention allows the loading of an application and/or objects from an application server via a card acceptance device and its supporting system infrastructure delivery mechanism, onto a card post issuance in a secure and confidential manner.

23 Claims, 15 Drawing Sheets

OTHER PUBLICATIONS

Chaum et al., "SmartCard 2000: The Future of IC Cards", Oct. 19, 1987, Elsevier Science Publishers, B.V.

Steven Levy, "E–Money (That's What I Want)", Dec. 1994, Wired Magazine.

Carol H. Fancher, "Smart Cards as Potetial Applications Grow, Computers in the Wallet are Making Unobstrusive Inroads", Aug. 1996, Scientific American Website.

Jerome Svigals, "SmartCards The New Bank Cards", 1985, MacMillan Publishing Company.

Roy Bright, "SmartCards: Principles, Practice, Applications", 1998, Ellis Horwood Limited.

Jerome Svigals, "SmartCards The Ultimate Personal Computer", 1985, MacMillan Publishing Company.

Hawkes et al., "Integrated Circuit Cards, Tags and Tokens", 1990, BSP Professional Books.

Hiro Shogase, The Very Smart Card: A Plastic Packet Bank:, Oct. 1988, IEEE Spectrum.

David Naccache, "Cryptographic Smart Cards", Jun. 3, 1996, IEEE Micro 1966 Website.

Zoreda et al., "Smart Cards", 1994, Artech House.

"Identification Card Systems—Inter–Sector Electronic Purse Part I: Concepts and Structures", 1994, European Standard, PrEN 1546.

"Identification Card Systems—Intr–Sector Electronic Purse Part 2: Security Architecture", 1994, European Standard, prEN XXXXX–2.

"Identification Card System—Inter–Sector Electronic Purse Part 3: Data Elements and Interchanges", 1994, European Prestandard,. prEN 1546–3.

"Identification Card System—Inter–Sector Electronic Purse Part 4: Devices", 1994, European Prestandard, prEN 1546–4.

"Identification Cards—Integrated Circuit(s) Cards With Contacts Part 1: Physical Characteristics", 1987, International Standard, ISO 7816–1, First Edition.

"Identification Cards—Integrated Circuit(s) Cards With Contacts Part 2: Dimensions and Location of the Contacts", 1988, International Standard ISO 7816–2, First Edition.

"Identification Cards—Integrated Circuit(s) Cards With Contacts Part 3: Electronic Signals and Transmission Protocols", International Standard, ISO/IEC 7816–3, First Edition.

"Identification Cards—Integrated Circuit(s) Cards with Contacts Part 4: Inter–Industry Commands for Interchange", International Standard, ISO/IEC 7816–4, First Edition.

"Identification Cards—Integrated Circuit(s) Cards With Contacts Part 5: Numbering System and Registration Procedure for Application Identifiers", 1993, International Standard, ISO/IEC DIS 7816–5.

"International Cards—Integrated Circuit(s) Cards With Contacts Part 6: Inter–Industry Data Elements", 1995, International Standard, ISO/IEC DIS 7816–6.

"Bank Cards—Magnetic Strip Data Content For Track 3", 1987, International Standard, ISO 4909 Second Edition.

"Identification Cards—Physical Characteristics", 1995, International Standard, ISO/IEC 7810, Second Edition.

"Identification Cards—Recording Technique—Part 1: Embossing", 1995. International Standard, ISO/IEC 7811–1, Second Edition.

"Identification Cards—Recording Technique—Part 2: Magnetic Strip", 1995, International Standard, ISO/IEC 7811–2, Second Edition.

"Identification Cards—Recording Technique—Part 3: Location of Embossed Characters on ID–1 Cards", 1995, International Standard, ISO.IEC 7811–5, Second Edition.

"Identification Cards—Recording Technique—Part 4: Location of Read–Only Magnetic Tracks—tracks 1 & 2", 1995 International Standard, ISO/IEC 7811–4, Second Edition.

"Identification Cards—Recording Technique—Part 5: Location of Read–Write Magnetic Track—Trck 3", 21995, International Standard ISO.IEC 7811–5, Second Edition.

"Identification Cards—Recording Technique—Part 6: Magnetic Stripe–High Coercivity", 1996, International Standard, ISO/IEC 7811–6, First Edition.

"Identification Cards—Financial Transaction Cards", 1990, International Standard, ISO/IEC 7813, Third Edition.

"Identification Cards—Financial Transaction Cards Amendment 1" 1996, International Standard, ISO/IEC 7813, Fourth Eiditon.

"Identification Cards—Contactless Integrated Circuit(s) Cards—Part 1: Physical Characteristics", 1992, International Standard, ISO/IEC 10536–1, First Edition.

"Identification Cards—Contactless Integrated Circuit(s) Cards—Part 2: Dimensions and Location of Coupling Aresa", 1995, International Standard, ISO/IEC 10536–2, First Edition.

"Identification Cards—Contactless Integrated Circuit(s) Cards—Part 3: Electronic Signals and Reset Procedures", 1996, International Standard, ISO/IEC 10536–3, First Edition.

"Financial transaction Cards–Security Architecture of Financial Transaction System Using Integrated Circuit Cards– Part 1: Card Life Cycle", Sep. 15, 1991, International Standard, ISO 1020–1, First Edition.

\* cited by examiner

SYSTEM AND METHOD FOR A MULTI-APPLICATION SMART CARD WHICH CAN FACILITATE A POST-ISSUANCE DOWNLOAD OF AN APPLICATION ONTO THE SMART CARD

CROSS REFERENCE TO RELATED APPLICATION

This application claims priority to U.S. provisional application No. 60/061,763 filed Oct. 14, 1997, which is herein incorporated by reference. This application further claims priority to U.S. provisional application No. 60/041,468 filed Mar. 24, 1997, which is also herein incorporated by reference.

This application is related to U.S. application Ser. No. 09/046,993 now U.S. Pat. No. 6,005,942 (VISAP009 or VISAP010), filed on even date herewith which is also herein incorporated by reference for all purposes.

FIELD OF THE INVENTION

The present invention relates to smart cards. In particular, the present invention relates to a system and method for providing a multi-application smart card which can facilitate a post-issuance download of an application onto the smart card.

BACKGROUND OF THE INVENTION

A smart card is typically a credit card-sized plastic card that includes a semiconductor chip capable of holding data supporting multiple applications.

Physically, a smart card often resembles a traditional "credit" card having one or more semiconductor devices attached to a module embedded in the card, providing contacts to the outside world. The card can interface with a point-of-sale terminal, an ATM, or a card reader integrated into a telephone, a computer, a vending machine, or any other appliance.

A micro-controller semiconductor device embedded in a "processor" smart card allows the card to undertake a range of computational operations, protected storage, encryption and decision making. Such a micro-controller typically includes a microprocessor, memory, and other functional hardware elements. Various types of cards are described in "The Advanced Card Report: Smart Card Primer", Kenneth R. Ayer and Joseph F. Schuler, The Schuler Consultancy, 1993.

One example of a smart card implemented as a processor card is illustrated in FIG. 1. Of course, a smart card may be implemented in many ways, and need not necessarily include a microprocessor or other features. The smart card may be programmed with various types of functionality, including applications such as stored-value; credit/debit; loyalty programs, etc.

In some embodiments, smart card 5 has an embedded micro-controller 10 that includes a microprocessor 12, random access memory (RAM) 14, read-only memory (ROM) 16, non-volatile memory 18, a cryptographic module 22, and a card reader interface 24. Other features of the micro-controller may be present but are not shown, such as a clock, a random number generator, interrupt control, control logic, a charge pump, power connections, and interface contacts that allow the card to communicate with the outside world.

Microprocessor 12 is any suitable central processing unit for executing commands and controlling the device. RAM 14 serves as storage for calculated results and as stack memory. ROM 16 stores the operating system, fixed data, standard routines, and look up tables. Non-volatile memory 18 (such as EPROM or EEPROM) serves to store information that must not be lost when the card is disconnected from a power source but that must also be alterable to accommodate data specific to individual cards or any changes possible over the card lifetime. This information might include a card identification number, a personal identification number, authorization levels, cash balances, credit limits, etc. Cryptographic module 22 is an optional hardware module used for performing a variety of crptographic algorithms. Card reader interface 24 includes the software and hardware necessary for communication with the outside world. A wide variety of interfaces are possible. By way of example, interface 24 may provide a contact interface, a close-coupled interface, a remote-coupled interface, or a variety of other interfaces. With a contact interface, signals from the microcontroller are routed to a number of metal contacts on the outside of the card which come in physical contact with similar contacts of a card reader device.

Various mechanical and electrical characteristics of smart card 5 and aspects of its interaction with a card reading device are defined by the following specifications, all of which are herein incorporated by reference.

Visa Integrated Circuit Card Specification, (Visa International Service Association 1996).

EMV Integrated Circuit Card Specification for Payment Systems, (Visa International Service Association 1996).

EMV Integrated Circuit Card Terminal Specification for Payment Systems, (Visa International Service Association 1996).

EMV Integrated Circuit Card Application Specification for Payment Systems, (Visa International Service Association 1996).

International Standard; Identification Cards—Integrated Circuit(s) Cards with Contacts, Parts 1–6 (International Standards Organization 1987–1995).

Prior to issuance of a smart card to a card user, the smart card is initialized such that some data is placed in the card. For example, during initialization, the smart card may be loaded with at least one application, such as credit or stored cash value, a file structure initialized with default values, and some initial cryptographic keys for transport security. Once a card is initialized, it is typically personalized. During personalization, the smart card is loaded with data which uniquely identifies the card. For example, the personalization data can include a maximum value of the card, a personal identification number (PIN), the currency in which the card is valid, the expiration date of the card, and cryptographic keys for the card.

A limitation of conventional smart cards is that new applications typically can not be added to an issued smart card. Smart cards are traditionally issued with one or more applications predefined and installed during the manufacturing process of the card. As a result, with traditional smart card implementation, once a card has been issued to a card user, the smart card becomes a fixed application card. If a new application is desired, the smart card is typically discarded and a new smart card, which includes the new application, is issued.

It would be desirable to provide a smart card which would allow applications to be loaded after the card is issued. Further, it is desirable to provide a mechanism to manage the loading of an application as well as general management of the applications on the smart card. Additionally, it is desirable to allow an application provider to keep cryptographic keys confidential from the issuer of the smart card and to securely allow application from different entities to coexist on a card.

SUMMARY OF THE INVENTION

Embodiments of the present invention teach a system and method which allows card issuers to add applications during the lifetime of the card after the card has already been issued (referred to herein as post issuance loading). The process of downloading an application after the card has been issued to the card holder will be referred to herein as a "secure install" process.

The system and method according to embodiments of the present invention allow the loading of an application and/or objects from an application server via a card acceptance device and its supporting system infrastructure delivery mechanism, onto a card, post issuance in a secure and confidential manner.

An embodiment of the present invention provides a system and method for providing confidential information to an application in a smart card. In a multi-application smart card, a privileged application, herein referred to as a security domain, is utilized as a confidential representative of an application provider. The security domain can contain cryptographic keys which can be kept confidential from the smart card issuer, thus allowing separation of cryptographic security between the issuer and the application provider. When a new application is loaded onto a smart card, the newly loaded application can utilize its associated security domain's cryptographic service. A privileged application representing the issuer, herein referred to as a card domain, can approve of commands, such as commands for initialization and personalization, by invoking the security domain's cryptographic service. In this manner, a post issuance download of an application onto the issued smart card can be accomplished.

A method according to an embodiment of the present invention for providing confidential information to an application in a smart card is presented. The method comprises the steps of providing a first application in the smart card, the first application including a cryptographic service; loading a second application onto the smart card; and installing the second application, wherein the cryptographic service of the first application is utilized to install the second application.

In another aspect of the invention, a system according to an embodiment of the present invention for providing confidential information to an application in a smart card is presented. The system comprises a first application associated with the issued smart card, wherein the first application includes cryptographic service; and a second application associated with the issued smart card, the second application being in communication with the first application, wherein the cryptographic service included in the first application is utilized for at least one function related to the second application. In yet another aspect of the invention, a method according to an embodiment of the present invention for providing an application to a smart card is presented. The method comprising the steps of issuing a smart card; loading a first application onto the issued smart card; and initializing the first application.

DETAILED DESCRIPTION OF THE PREFERRED EMBODIMENTS

The following description is presented to enable one of ordinary skill in the art to make and to use the invention and is provided in the context of a patent application and its requirements. Various modifications to the preferred embodiments will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
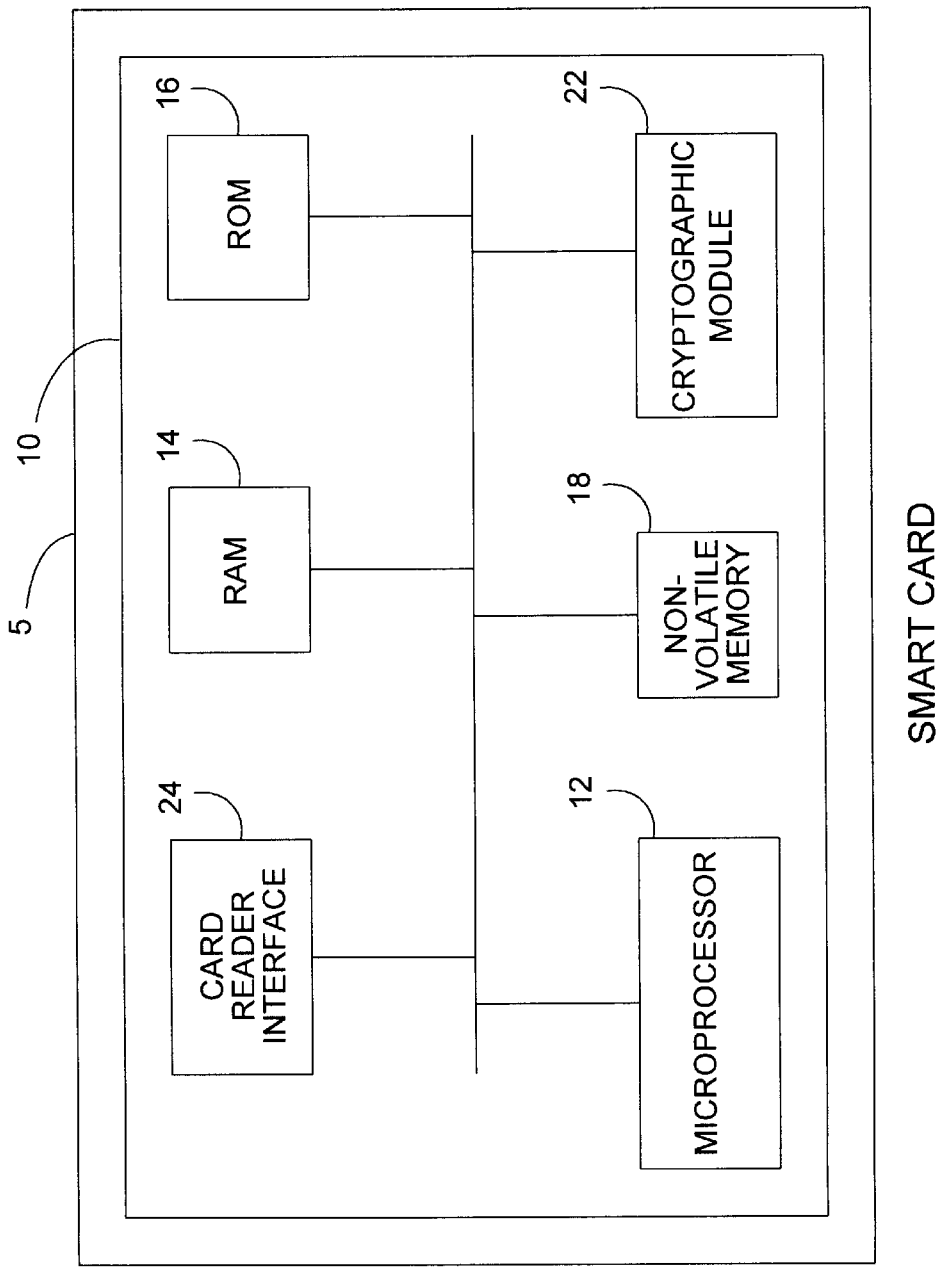
FIG. 1 is a block diagram of a smart card system suitable for implementing the present invention.
Figure 2:
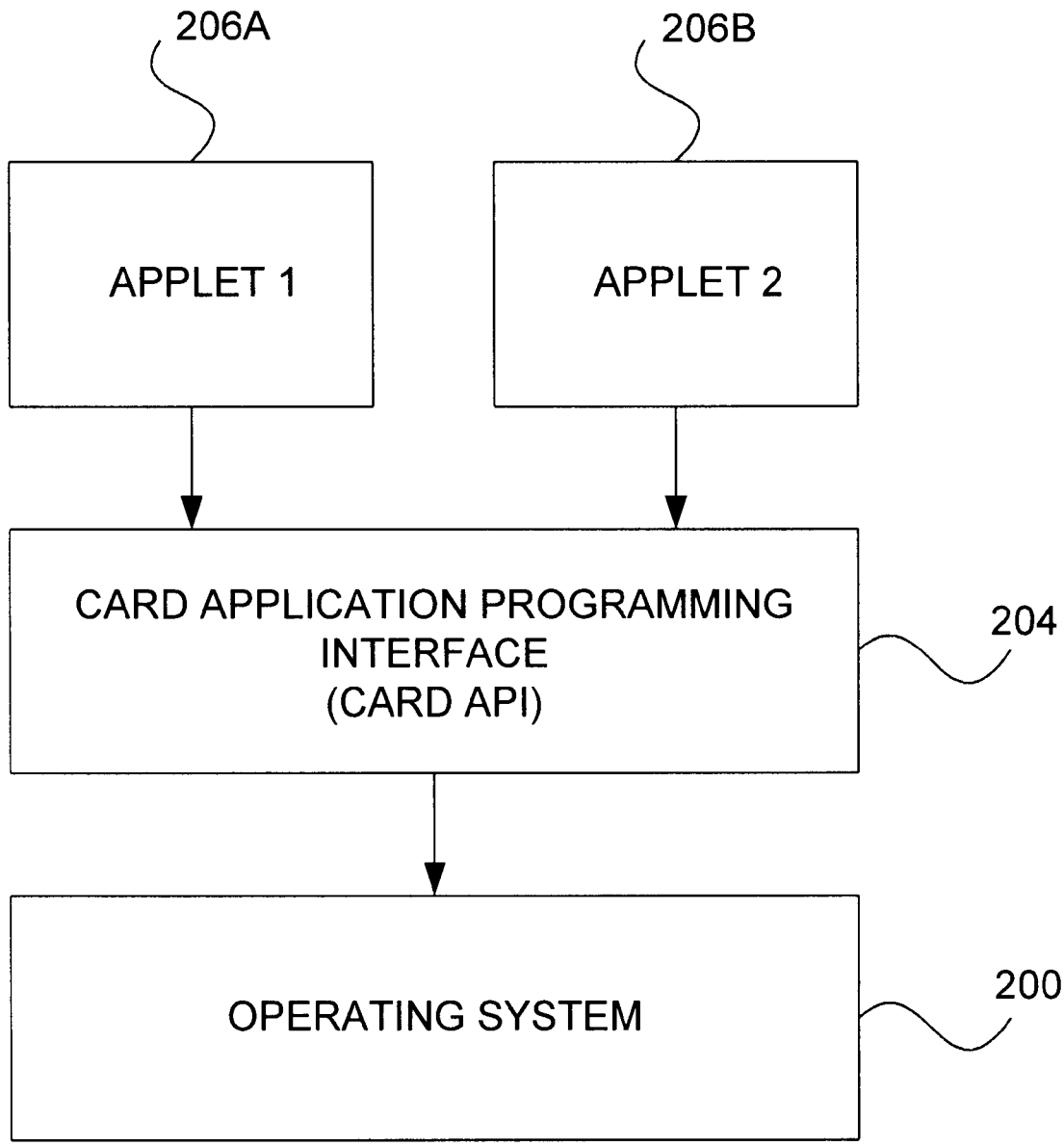
FIG. 2 is an example of a block diagram of software layers which can be utilized in a smart card.

FIG. 2 is a block diagram of an example of software layers which can be utilized in a smart card. The smart card shown in FIG. 2 includes an operating system 200, a card application programming interface (API) 204, and applications 206A–206B. Operating system 200 can include functionality to control the cards, memory management, input/output (I/O), and cryptographic features. Card API 204 utilizes the instructions from operating system 200 and writes these instructions into blocks which can be reused for common routines in multiple applications. Applications 206A and 206B can run on the smart card via instructions from API 204. These applications can include any application which can run on a smart card, such as stored value, credit, debit, transit, and loyalty.

One embodiment of the present invention is based upon the Java Card standard. In this case applications are referred to as 'Applets' and they are written to link to a Java Card API which is the application programming interface present on smart cards built to the Java Card standard.

Although the conventional software system shown in FIG. 2 allows for multiple applications, it does not solve the problem of how to load, securely, an application after issuance of the smart card to a user. If an application is to be loaded post issuance, a mechanism is needed to manage the loading of an application as well as general management of the applications on the smart card. Additionally, an application provider may wish to keep cryptographic keys confidential from the issuer of the smart card. Accordingly, a mechanism is needed to provide for the separation of confidential information between an application provider and an issuer of a smart card. Embodiments of the present invention address such a need.

Figure 3A:
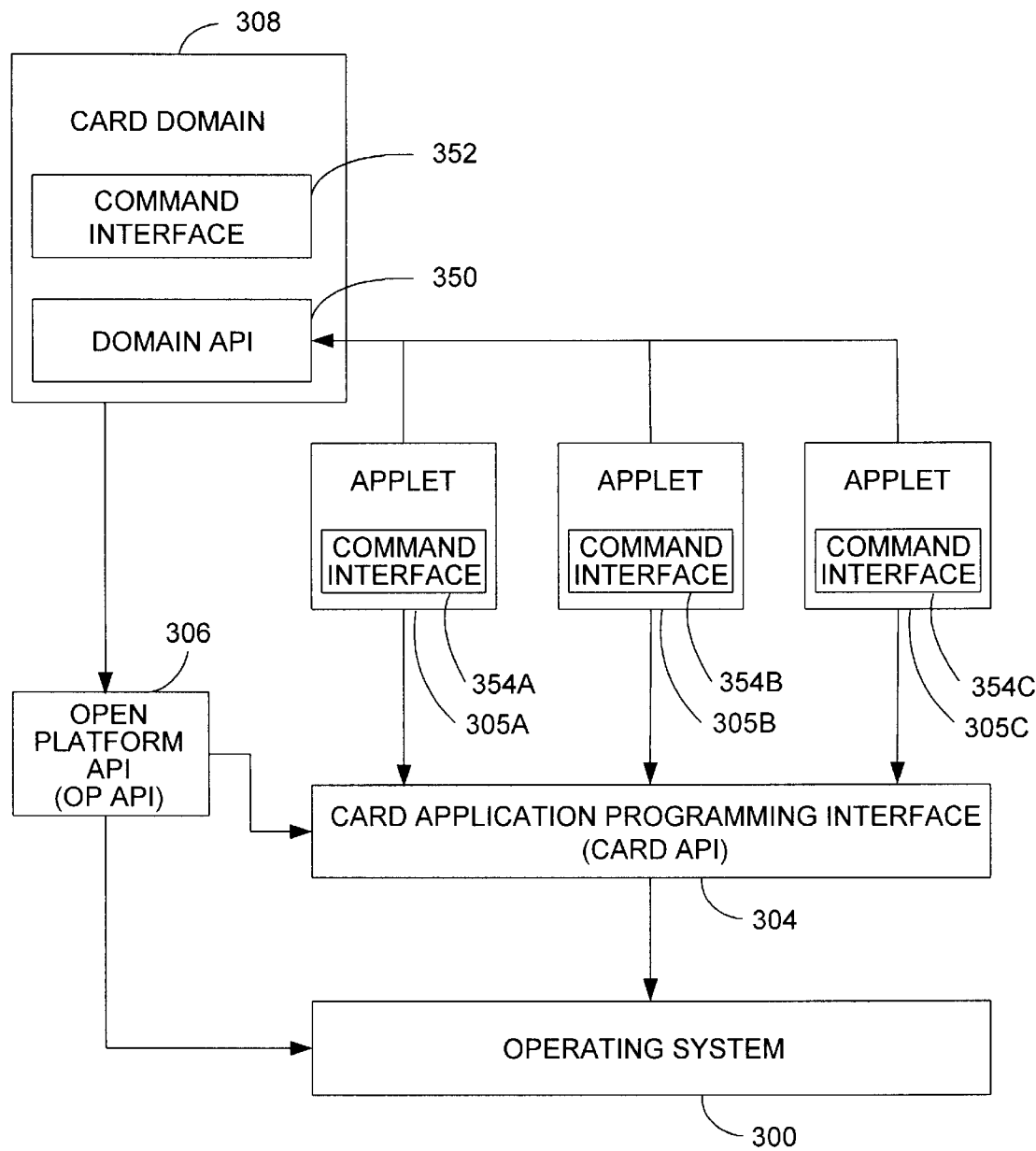
FIGS. 3A–3B are block diagrams of examples of software layers according to embodiments of the present invention.
Figure 3B:
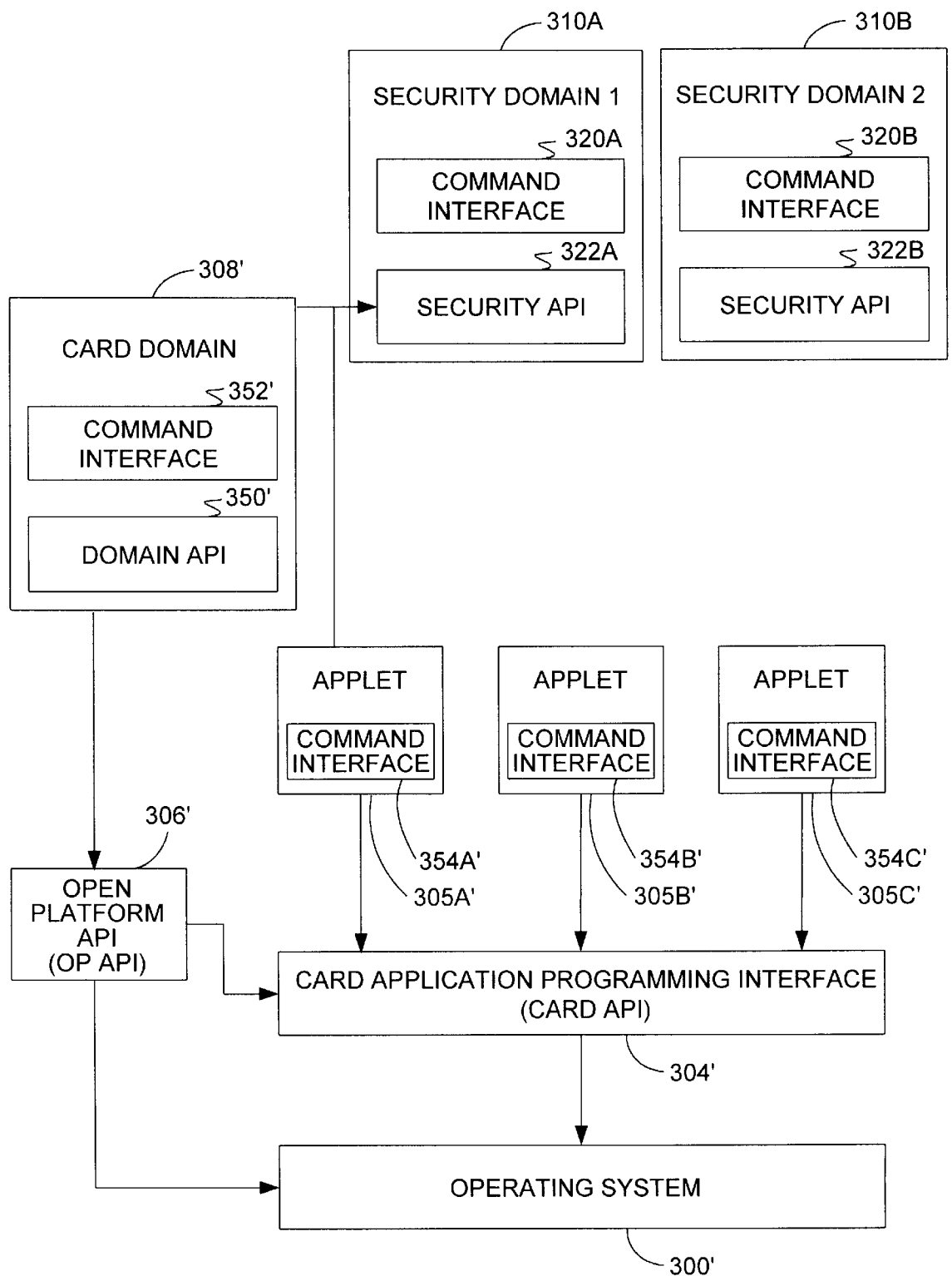

FIGS. 3A–3B are block diagrams showing software components of a smart card according to embodiments of the present invention. The arrows indicate dependencies between components. FIG. 3A shows an embodiment of a smart card utilizing a card domain, while FIG. 3B shows an embodiment of a smart card utilizing a security domain, as well as a card domain.

The example shown in FIG. 3A includes an operating system 300, a card API 304, applications 305A–305C, a card domain 308, and open platform (OP) API 306. The system shown in FIG. 3 allows for a secure and managed post issuance download of an application onto a smart card.

Open platform API 306 classifies instructions into card domain 308 and security domains 310A–310B (shown in FIG. 3B). Accordingly, OP API 306 facilitates the formation of instructions into sets which can be identified as being included as part of card domain 308 and security domains 310A–310B.

Applications 305A–305C can include any application which can be supported by a smart card. Examples of these applications include credit, debit, stored value, transit, and loyalty. Applications 305A–305C are shown to include command interfaces, such as APDU interfaces 354A–354C which facilitate communication with the external environment.

Applications 305A and 305B can run on the smart card via instructions from card API 304. Card API 304 is implemented using the instructions from the card operating system and writes these instructions into blocks which can be reused for common routines for multiple applications. Those skilled in the art will recognize that a translation layer or interpreter may reside between API 304 and operating system 300. An interpreter interprets the diverse hardware chip instructions from vendor specific operating system 300 into a form which can be readily utilized by card API 304.

Card domain 308 can be a "privileged" application which represents the interests of the smart card issuer. As a "privileged" application, card domain 308 may be configured to perform multiple functions to manage various aspects of the smart card. For instance, card domain 308 can perform functions such as installing an application on the smart card, installing security domain s 310A–310B (shown on FIG. 3B), personalization and reading of card global data, managing card life cycle states (including card blocking), performing auditing of a blocked card, maintaining a mapping of card applications 305A–305C to security domains 310A–310B, and performing security domain functions for applications 305A–305C which are not associated with a security domain 310.

Card domain 308 is shown to include an API interface 350 and a command interface, such as Application Protocol Data Unit (APDU) interface 352. APDU interface 352 facilitates interfacing with the external environment. In compliance with, e.g., International Standards Organization (ISO) Standard 7816-4, entitled "Identification Cards—Integrated circuit(s) cards with contacts—Part 4, Inter-industry commands for interchange," which is herein incorporated by reference.

For example, APDU interface 352 can be used during post issuance installation of an application or during loading of card global data. An application load and install option is performed via a set of appropriate APDU commands received by card domain 308. API interface 350 facilitates interfacing with the internal smart card environment. For example, API interface 350 can by used if card domain 308 is being utilized as a default in place of a security domain 310, or if an application requires information such as card global data, key derivation data, or information regarding card life cycle.

Memory allocations have been performed by the time an application is in an install state. An application is also personalized after loading and installing. A personalized application includes card holder specific data and other required data which allows the application to run. In addition to managing the installation and personalization of the application, card domain 308 can also manage global card information. Global card information includes information that several applications may need to perform their functions, such as card holder name and card unique data utilized in cryptographic key derivations. Card domain 308 can be a repository for the global card information to avoid storing the same data multiple times.

Card domain 308 can also manage card life cycle states including card blocking. The smart card will typically move through several states during its life cycle. Card domain 308 keeps track of what state the card is in during its life cycle. Card domain 308 may also manage a block request to block virtually all functions of the card. Further details of card domain 308 management of a block request will be discussed in conjunction with FIG. 6. Card domain 308 may also keep track of the state of an application during an application's life cycle. This kind of information regarding an application can be utilized during an auditing of a card. Auditing can be performed at any time during a card's lifetime. For instance, auditing may be performed after a card has been blocked or prior to installing a new application to validate the card contents. Although virtually all card functions are no longer functioning when a card is blocked, an issuer may be able to query card domain 308 for information regarding a state of an application or the life cycle state of the card. In this manner, the issuer of a card may still access a profile of the blocked card and its applications.

FIG. 3B shows an embodiment of the present invention utilizing a security domain 310, as well as card domain 308. The example shown in FIG. 3B includes a operating system 300', a card API 304', applications 305A–305C', security domains 310A–310B', a card domain 308', and open platform (OP) API 306'. The system shown in FIG. 3B also allows for a secure and managed post issuance download of an application onto a smart card.

Card domain 308' can work in conjunction with a security domain 310. Security domain 310 is a logical construct that can be implemented as an application to provide security related functions to card domain 308' and to applications associated with security domain 310. Security domains 310A–310B can assist in secure post issuance loading of an application onto the smart card. Security domains 310A–310B provide for a mechanism which keeps the application provider's confidential information, such as cryptographic keys, from being disclosed to the issuer of the smart card.

There may be multiple security domains 310 on a smart card, each represented by a unique cryptographic relationship. A security domain 310 is responsible for the management and sharing of cryptographic keys and the associated cryptographic methods which make up the security domain's cryptographic relationship. An application which is loaded to the smart card post issuance can be associated with a security domain, preferably with only one security domain. However, multiple applications may be associated with the same security domain 310. Applications installed on a smart card during the pre-issuance phase may optionally be associated with a security domain 310 on the smart card for purposes of loading confidential personalization data to those applications using security domain 310 keys.

The software for security domain 310 may be installed by the card manufacturer at the time of card manufacturing (e.g., when the ROM is masked), or may be added during initialization or personalization stages. Security domains 310 can be implemented as selectable applications which are isolated from one another and the rest of the system. If security domain 310 is implemented in a Java card as an application, standard Java card security can be relied upon to ensure isolation of security domain 310. In addition, or alternatively, other security mechanisms such as hardware security which can be utilized through OP API 306 implementation. OP API 306 may utilize special security features to enforce isolation of security domain 310. An example of such a security feature is the utilization of chip hardware security routines which may be employed by OP API 306.

Each security domain 310A–310B provides a command interface, such as an Application Protocol Data Unit (APDU) interface 320A–320B, for communication off card and an on card API interface 322A–322B.

The APDU interface 320A–320B consists of personalization commands and is intended to allow the initial loading of security domain keys and to support key rotation if desired during the life of the security domain. API interfaces 322A–322B may include a signature verification method and decryption method which are shared with card domain 308' for post issuance loading of applications. Additionally, applications may utilize API interfaces 322A–322B for decrypting application confidential data. Note that card domain 308' may always function as a security domain and does so as the default.

Security domain 310 manages signing and decrypting keys and provides cryptographic services using those keys. Security domain 310 processes APDU's for numerous functions. These functions can include key management functions e.g., functions to load or update keys. During Secure Installation of an application, security domain 310 can provide services to card domain 308' to decrypt an application install file and check the signature of an application file. For an application associated with a security domain 310, that application's security domain 310 provides decrypt and signature functions, such as MACing on an update key APDU command during the personalization phase of a newly installed application. Thereafter, the application can use the updated key to decrypt and check signatures on subsequent key updates.

The smart card issuer may decide whether security domain 310 utilizes a static key or a session key for transactions. A static key is a cryptographic key which exists prior to processing APDUs and which exist during and after the processing of APDUs. A session key is a cryptographic key which can be generated for a particular transaction and is typically no longer used for APDU processing after the transaction. If a session key is utilized, security domain 310 preferably derives its own session key for processing APDUs.

Figure 4:
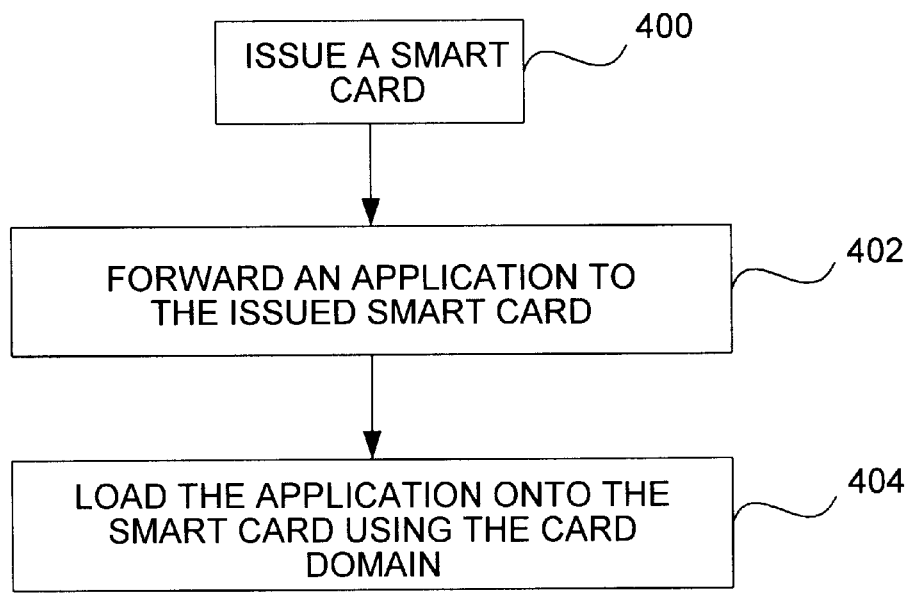
FIG. 4 is a flow diagram of an example of a method according to an embodiment of the present invention for installing an application onto an issued smart card utilizing a card domain.

FIG. 4 is a flow diagram of a method accordingly to an embodiment of the present invention for providing an application onto a smart card. The example illustrated in FIG. 4 also applies to installing a security domain 310 onto a smart card. Note that all of the flow diagrams in this application are merely examples. Accordingly, the illustrated steps of this and any other flow diagram herein, can occur in various orders and in varying manners in order to accomplish virtually the same goal.

A smart card is issued (step 400), and an application is forwarded to the issued smart card (step 402). The forwarding of the application can occur through any electronic media which can interface with a smart card and connect to an appropriate network. For example, devices such as an automatic teller machine (ATM), a display phone, or a home computer, can be used to forward an application to the issued smart card. The forwarded application is then loaded onto the smart card, wherein the loading of the application is managed by card domain 308 (step 404).

Figure 5:
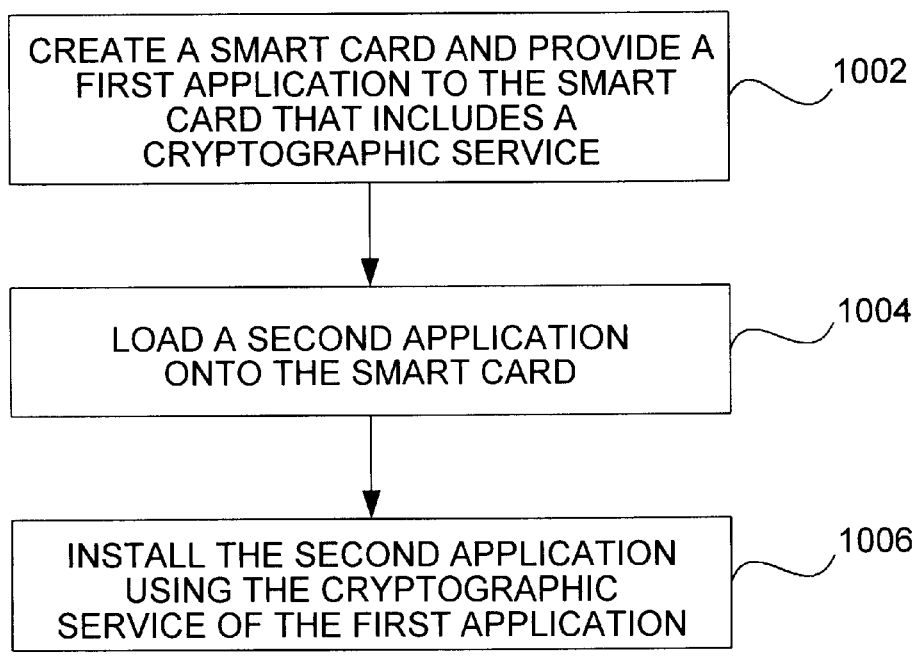
FIG. 5 is a flow diagram of a method according to an embodiment of the present invention for providing confidential information to an application in a smart card using security domains.

FIG. 5 is another flow diagram of a method according to an embodiment of the present invention for providing an application onto an issued smart card. A smart card is created and provided with a first application, the first application including a cryptographic service (step 1002). A second application is loaded onto the smart card (step 1004). Thereafter, the second application is installed, wherein the cryptographic service of the first application is utilized to install the second application (step 1006).

Figure 6:
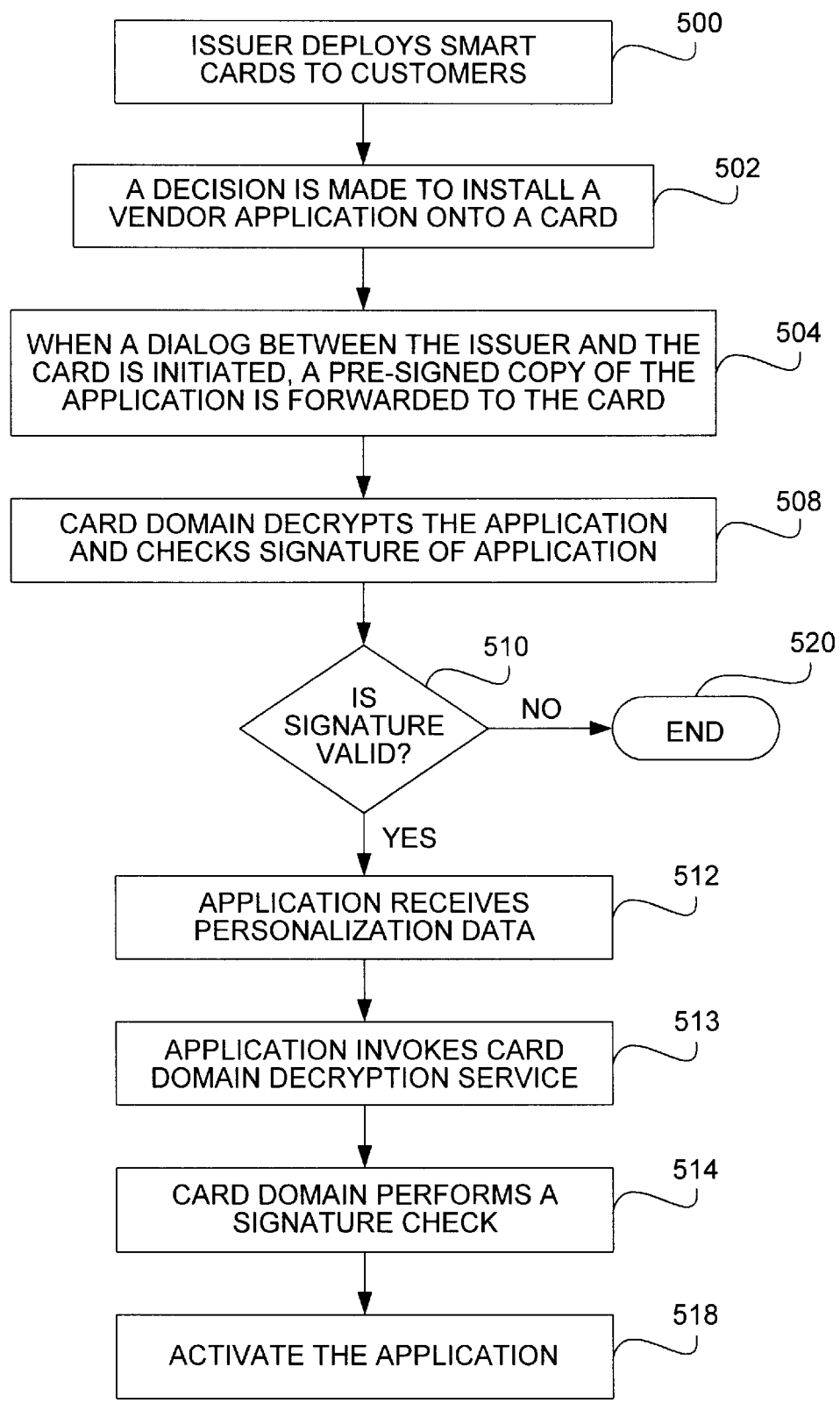
FIG. 6 is a flow diagram of an example of a method according to an embodiment of the present invention for installing an application onto an issued smart card utilizing a card domain.

FIG. 6 is another flow diagram of an example of a method according to an embodiment of the present invention for providing an application onto an issued smart card. This method for providing an application also applies to providing a security domain 310 onto the smart card. In the example shown in FIG. 6, a card issuer deploys smart cards to customers (step 500). A decision is made to install vendor A's application onto the issued smart card (step 502). When a dialogue between the issuer and the smart card is initiated, a pre-signed copy of the application is forwarded to the smart card (step 504). As previously stated, the dialogue between the issuer and the smart card can occur via any electronic device which can interface with a smart card and connect to an appropriate network. The application can be pre-signed with a key equivalent to that which already exists on the card so that each application has a unique signature that can be verified by the card.

Card domain 308 can then take the steps to load the application. Card domain 308 decrypts the forwarded application and checks the signature of the application (step 508). Card domain 308 can decrypt the application with the issuer's secret key. An appropriate cryptography method, such as Data Encryption Standard (DES) or 3DES, can be utilized to decrypt at least a portion of the application. Those skilled in the art will recognize that a number of cryptographic techniques may be used to implement embodiments of the present invention. For the purpose of illustration, symmetric key techniques are addressed herein, although asymmetric techniques are also contemplated. A good general cryptography reference is Schneier, Applied Cryptography, 2d Ed. (John Wiley, 1996), the contents of which are incorporated herein by reference.

It is then determined whether the signature on the application is valid (step 510). If the signature associated with the application is not valid, then the application is not loaded onto the card and the process ends (step 520). If, however, the signature associated with the application is valid the application is then installed and available for personalization. During personalization the application receives personalization data (step 512). Personalization data includes data which is unique to the smart card user. For instance, in a airline loyalty application, personalization data can include the smart card user's seating preference, meal preference, and eligibility for various possible perks. This personalization data can also be signed and encrypted.

The application then invokes card domain's 308 decryption service (step 513). Card domain 308 can then performs a signature check (step 514). Methods of decrypting personalization data and performing signature checks are well known in the art. Finally, the application can then be activated (step 518).

A new application which as been downloaded onto a smart card post-issuance can be stored in a variety of ways. One example is to store the application into a file. Another example is to maintain a pointer to the application object.

Figure 7A:
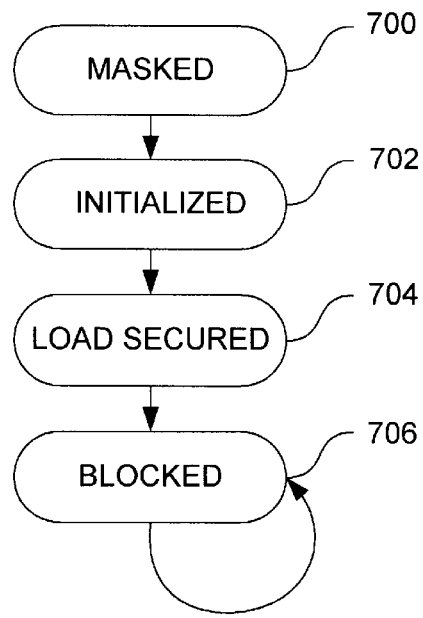
FIG. 7A is a flow diagram illustrating a sequence of card life states.

FIG. 7A is a flow diagram illustrating an example of a sequence of card life states. The sequence is preferably considered irreversible. The first card life state is when the smart card is Masked (700). During the Masked state (700), the smart card obtains its operating system, card identification, and preferably at least one application. The Masked state (700) is achieved as soon as all of the necessary components for card initialization are made available. An example of when necessary components are made available is when card domain 308 and OP API 306 are enabled, as well as the Java card environment being enabled, such as Java card virtual machine 302 and Java card API 304 (both of FIG. 3).

After the Masked state, the next state is the Initialized (step 702) state. The Initialized state is achieved once all card activity requiring an initialization key is complete. As part of card initialization, if not already available, the card domain 308 application must be installed and registered. In addition, one or more security domains may also be installed and registered. These installed domains must then be selected and personalized. An initialization key is a secret key which is typically used by a smart card manufacturer during loading of data onto the smart card prior to issuance.

The next state is Load Secured (step 704). The Load Secured state is achieved after a secure install (post-issuance download) mechanism for loading of applications through the remainder of the card lifetime has been established.

The final card life state is when the card is either expired or blocked (step 706). The blocked state is achieved as soon as an authorized smart card application has received a command to block the card.

The card life cycle is preferably an irreversible sequence of states with increasing security. Initialization and all subsequent card life cycle states and their transition are preferably under the control of card domain 308. Card domain 308 executes and responds to commands that result in a transition in a card life cycle from one state to the next. These commands are preferably Application Protocol Data Unit (APDU) commands. Card domain 308 is also responsible for the installation of applications on the card, but preferably has no control over the applications' life cycle states. Each application is preferably responsible for its own application life cycle state management but it preferably allows card domain 308 to have access to its life cycle states for auditing purposes.

The Card Life cycle is designed in such a way to increase the level of security enforced by the card at each successive state. As stated above, the cycle is also established as a process which can only ratchet forward to ensure that once the card begins a life cycle state with associated security policies, the only option is to cycle forward to the next state in the life cycle with a higher level of security. The Card Domain as the system security manager of the card maintains the current life cycle state, enforces the associated security policies, and controls the state transitions in the Card life cycle.

Figure 7B:
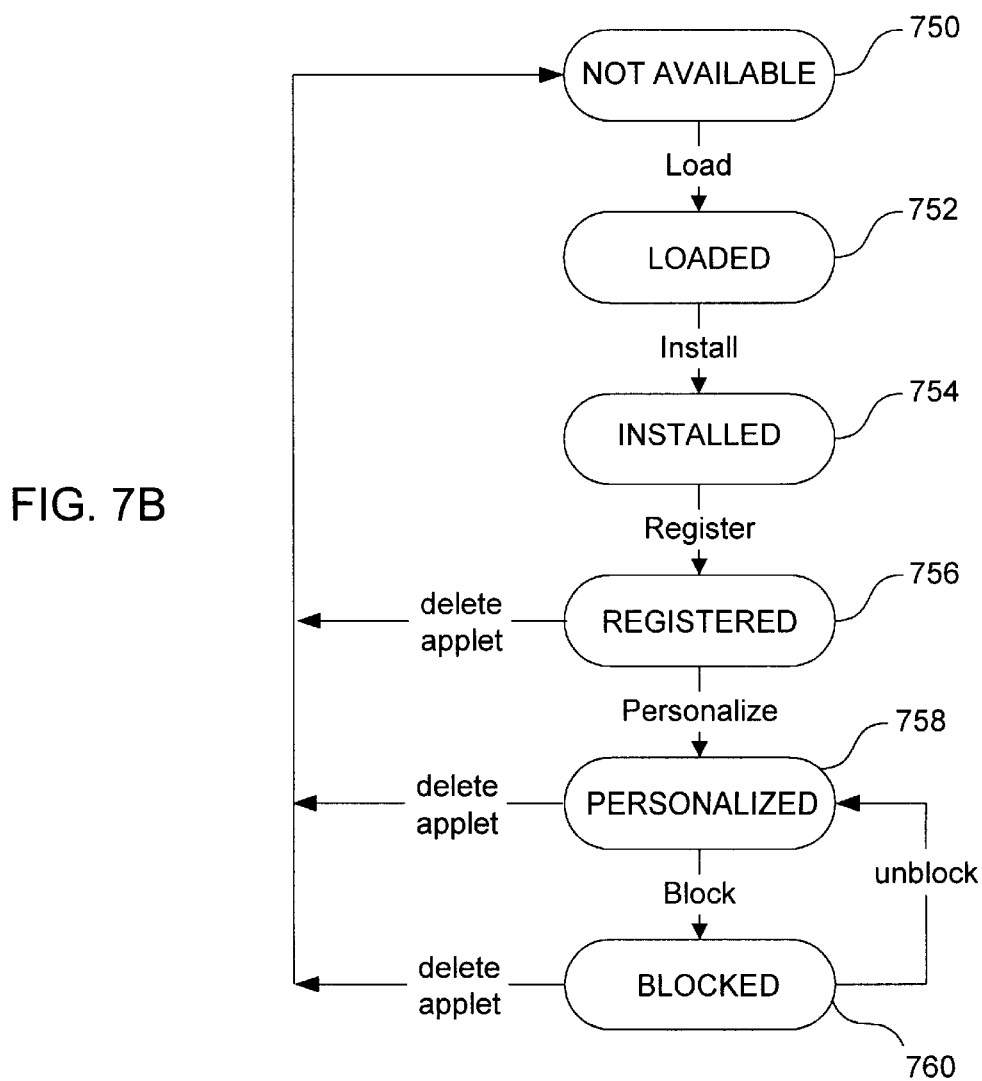
FIG. 7B is a flow diagram illustrating a sequence of card life states.

FIG. 7B is a flow diagram illustrating an example of a sequence of an application life cycle. The application is initially unavailable (step 750). The next state is a loaded state (step 752). The application reaches the loaded state once the application has been loaded onto the smart card. The application is then installed (step 754), and registered (step 756). Once the application is registered, it can be deleted at any time thereafter. The next state is the personalized state, wherein personalized information is included in the application (step 758). Finally, the application may expire or be blocked (step 760).

Figure 8:
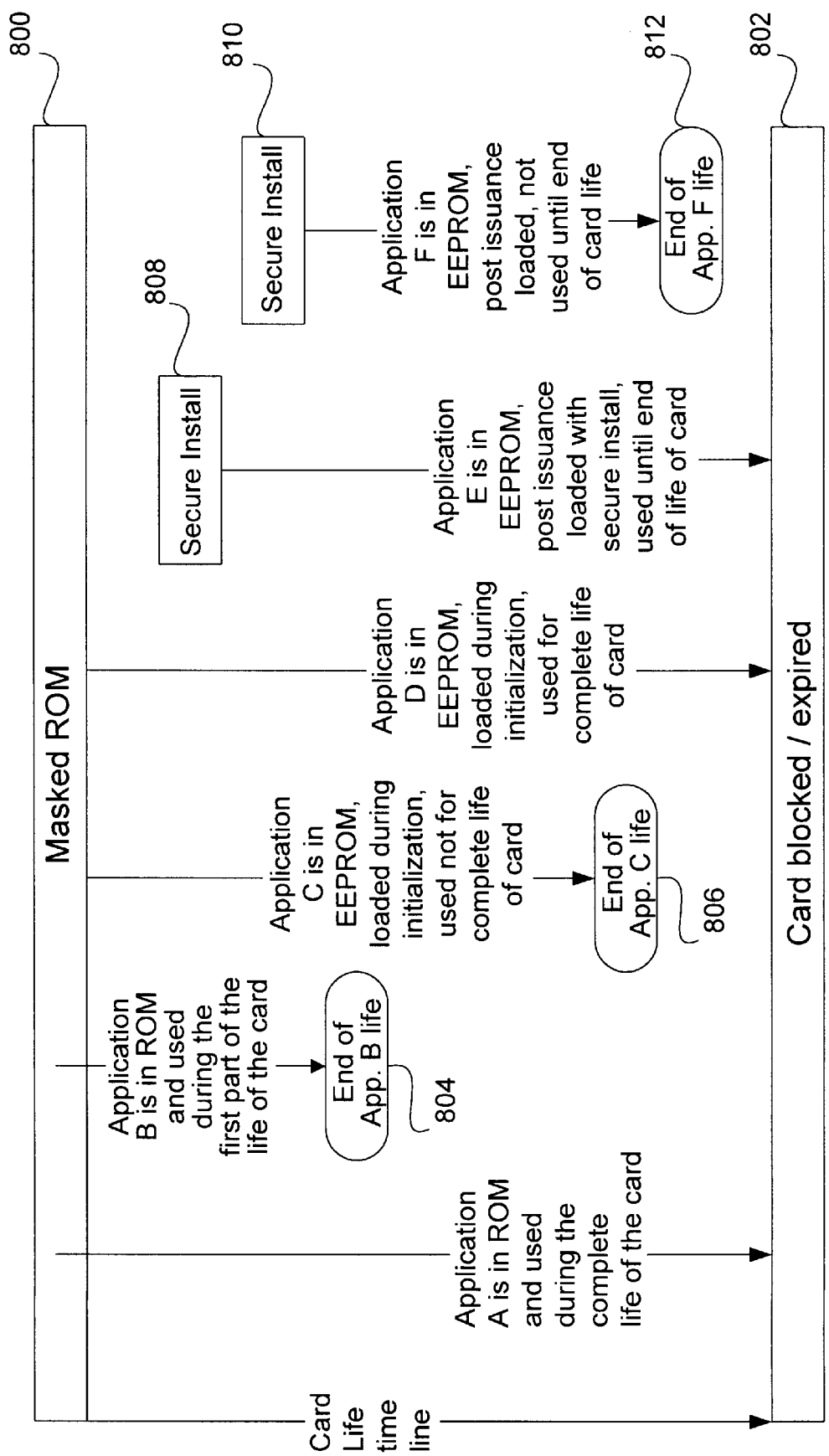
FIG. 8 is an illustration of an example of a card life cycle.

FIG. 8 is an illustration of an example of multi-application card life time line. This time line starts with a Masked ROM stage 800 and ends with a card blocked/expired stage 802. At Masked ROM stage 800, applications A, B, C and D are shown to be installed. This example shows applications A and B being installed at a masking stage of the card, applications C and D being installed at initialization stage, and applications D and F being installed post issuance.

In this example, application A can be installed in ROM and used during the complete life of the card from Masked ROM stage 800 to card blocked/expired stage 802. Application B is also in ROM and utilized during a first portion of the life of the smart card. The life of application B is ended at stage 804A. Application C is located in non-volatile memory, such as EEPROM, which is loaded during initialization. Application C is shown to expire at stage 804B. Application D is also located in EEPROM and is used for the complete life of the card until card blocked/expired stage 802. Application E is installed at stage 806A, sometime after issuance of the smart card. Application E is located in EEPROM and used until the end of the card life at card blocked/expired stage 802. Application F is also installed post issuance at stage 806B, and expires sometime before the end of the card life at stage 804C.

Figure 9:
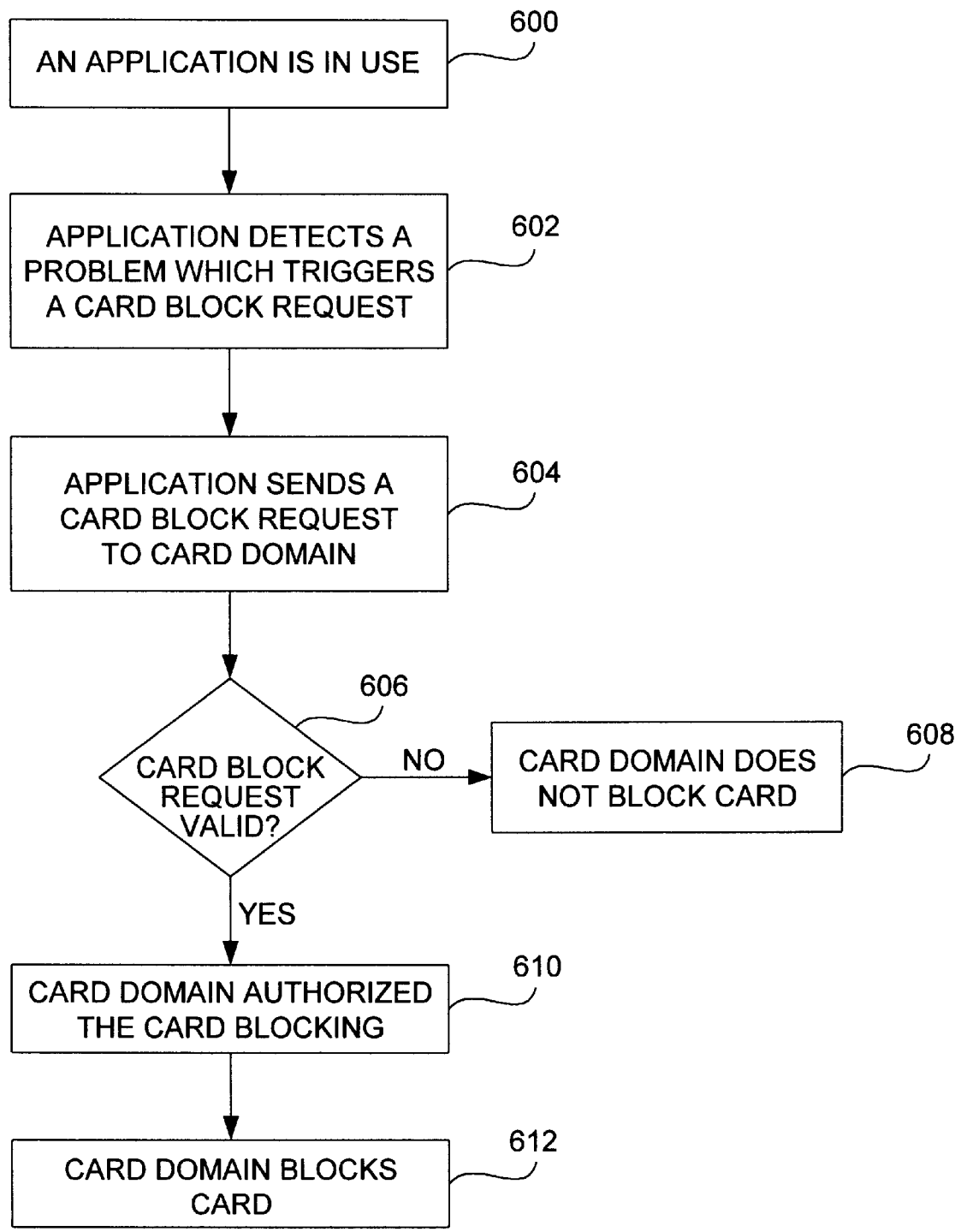
FIG. 9 is a flow diagram of an example of a method according to an embodiment of the present invention for blocking a card utilizing a card domain.

FIG. 9 is a flow diagram of a method according to an embodiment of the present invention for blocking a card. A card be can be blocked if a breach of security is detected by an application. According to an embodiment of the present invention, a smart card can be blocked while an application is in use. A blocked card will no longer operate so that a suspect user cannot utilize any of the applications on the smart card. Blocking is merely one example of the many functions card domain 308 can perform in managing the other applications on the smart card. Examples of other functions include installing an application on the smart card, installing security domains 310A–310B, personalization and reading of card global data, managing card life cycle states including card blocking, performing auditing of a block card, maintaining a mapping of card applications to security domains, and performing security domain functions for applications which are not associated with a security domain.

In the example shown in FIG. 9, an application is currently in use (step 600). The application detects a problem which triggers a card block request from the application (step 602). The application then sends a card block request to card domain 308 (step 604). Card domain 308 determines whether the card block request is valid (step 606). A card block request can be valid if the request originates from a predetermined application. If the card block request is not valid, the card domain 308 does not block the smart card (step 608). However, if the card block request is valid, then card domain 808 authorizes the card blocking (step 610), and card domain 308 blocks the smart card (step 612) such that the smart card will reject any attempted transactions for any of the applications on the card.

Figure 10:
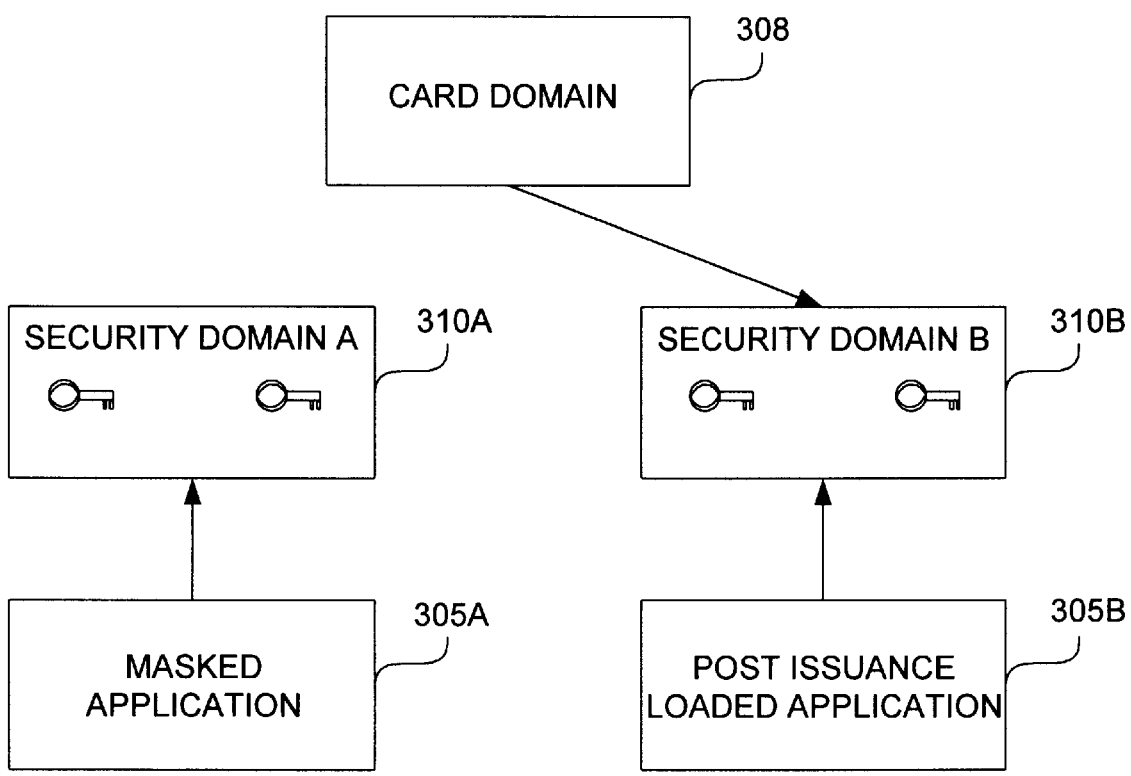
FIG. 10 is a block diagram illustrating interactions between a card domain and a security domain on a smart card according to an embodiment of the present invention.

FIG. 10 is a block diagram illustrating the use of security domain 310 by the card domain 308. The method and system according to an embodiment of the present invention allows for multiple application providers to be represented on a smart card in a secure and confidential manner. This security and confidentiality can be achieved through the use of security domain 310A–310B shown in FIG. 3.

FIG. 10 illustrates an example of a smart card which contains two security domains 310A–310B. In this example, it is assumed that a masked application 305A from the smart card is associated with a security domain, such as security domain 310A, and an additional application 305B will be added post issuance and be associated with a second security domain, such as security domain 310B. The arrows indicate key relationships between the various smart card entities. Masked application 305A uses key services from security domain 310A for decrypting confidential data and optionally for full personalization. Card domain 308 uses key services from security domain 310B for decrypting and checking the signature of an application loaded post issuance, such as post issuance loaded application 305B. Post issuance loaded application 305B uses key services from security domain 310B for decrypting confidential data and optionally for full personalization.

Figure 11A:
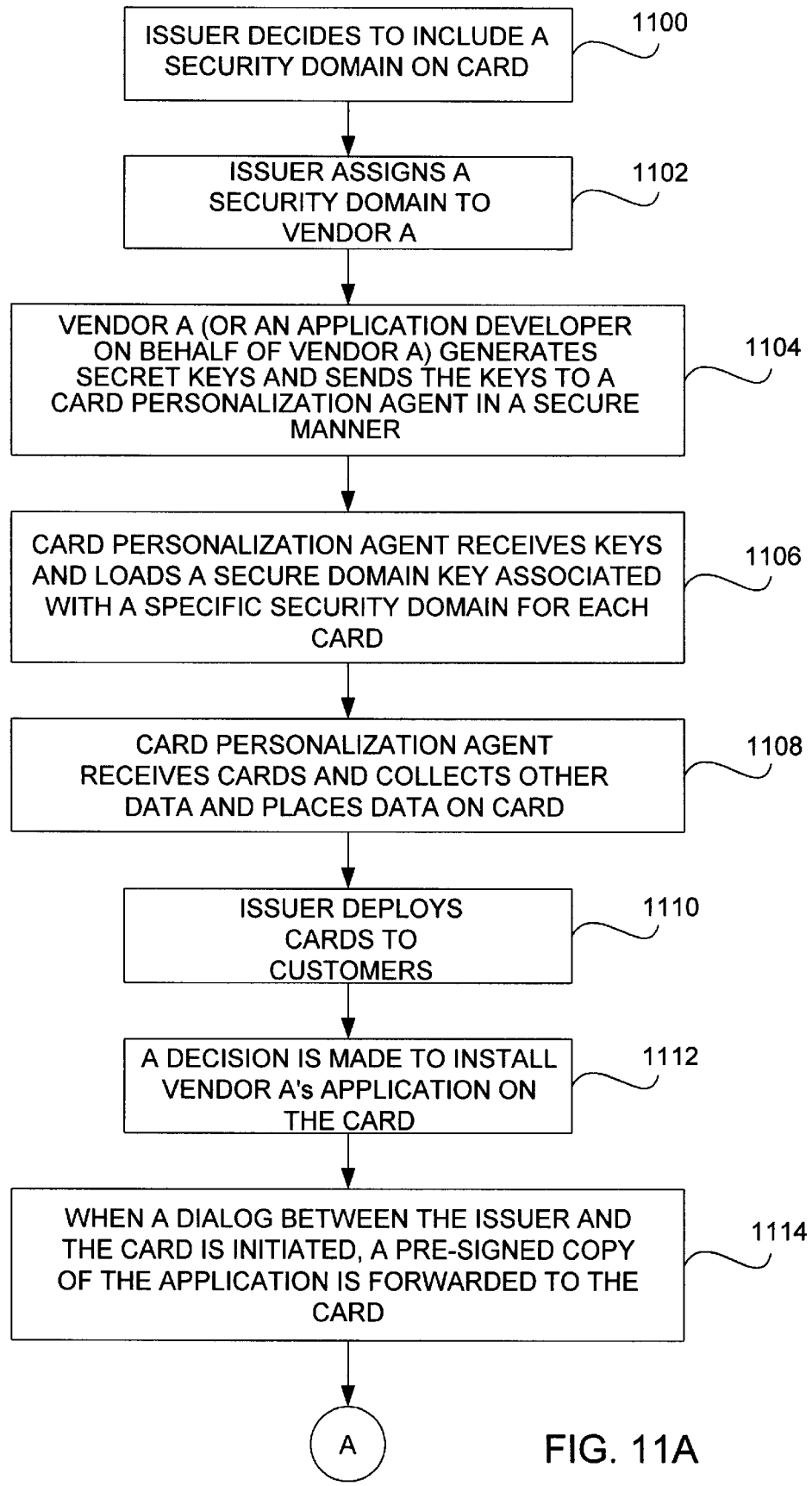
FIGS. 11A and 11B are flow diagrams of an example of a method according to an embodiment of the present invention for loading an application by using a security domain after the smart card has issued.
Figure 11B:
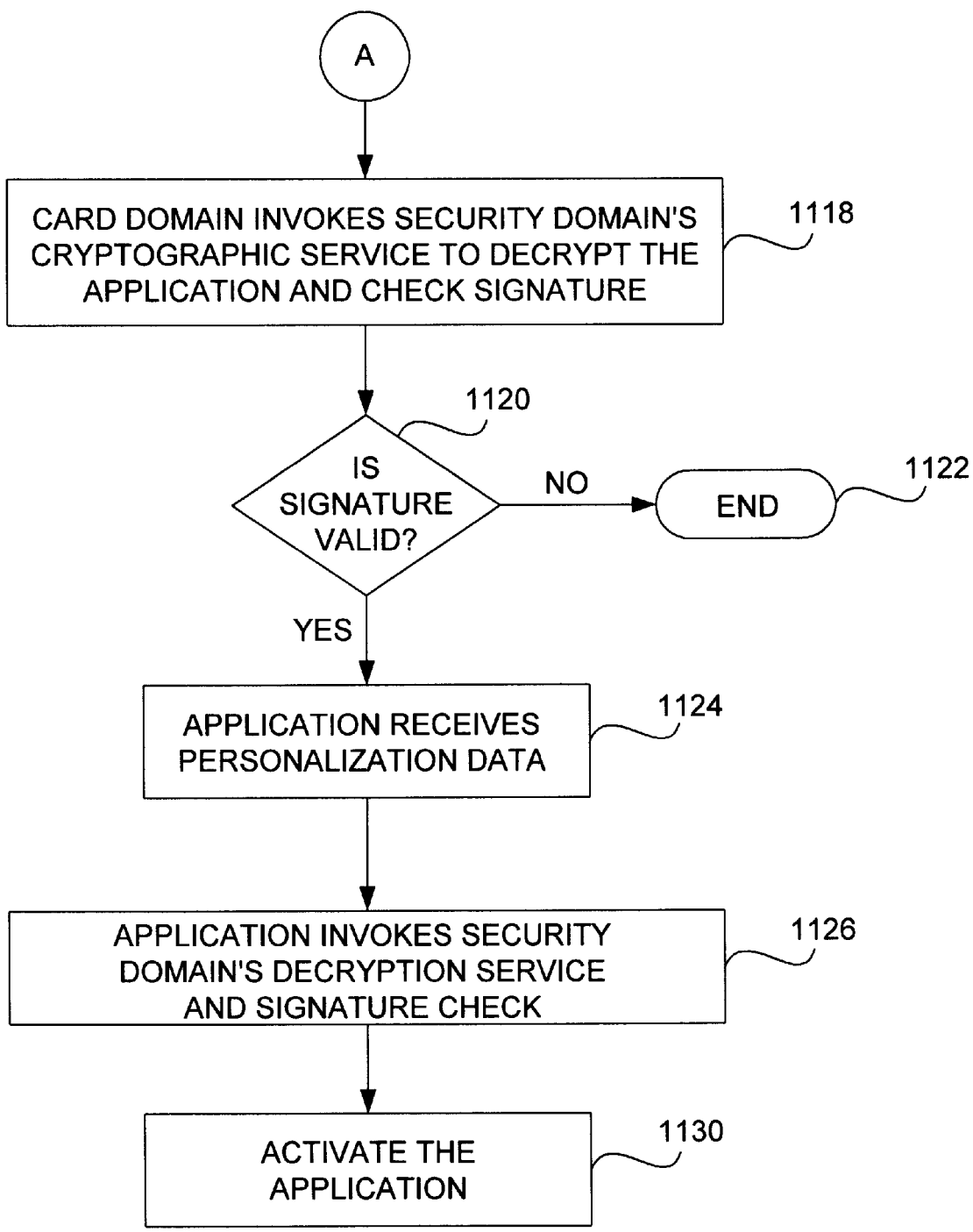

FIGS. 11A and 11B are further flow diagrams of an example for a method according to an embodiment of the present invention for providing an application onto an issued smart card. The card issuer decides to include a security domain 310 onto a smart card (step 1100). The issuer assigns security domain 310 to vendor A (step 1102). Vendor A, or an application developer on behalf of vendor A, generates cryptographic keys such as those used in symmetric or asymmetric cryptography operations (step 1104). Examples of these cryptography operations include encryption, decryption, MACing, Hashing, and digital signatures. Examples of cryptographic methods which utilize such keys and are suitable for implementation for the embodiment of the method and system of the present invention include Data Encryption Standard (DES) and 3DES. The card personalization agent receives the keys and loads security domain keys associated with a specific security domain 310 for each smart card (1106). The card personalization agent receives smart cards and collects other data, such as application and card holder specific data, and places data on the smart card (step 1108).

The card issuer then deploys the smart card to customers (step 1110). A decision is then made to install vendor A's application on the smart card (step 1112). When a dialogue between the smart card issuer and the smart card is initiated, a signed copy of the application is forwarded to the smart card (step 1114). The application can be signed with a key equivalent to that which already exists on the smart card so that each application has a unique signature that can be verified by the smart card.

The smart card's card domain 308 then takes steps to load the application. Card domain 308 invokes an associated security domain's cryptographic service to decrypt the application and check the signature (step 1118). It is then determined if the signature is valid (step 1120). If the signature is not valid, the process ends (step 1122). If, however, the signature is found to be valid, then the application receives personalization data which can be signed and optionally encrypted (step 1124). The loaded application then invokes its associated security domain's decryption service and signature check (step 1126). Secret keys required to run or operate the application on the smart card are used to activate the application by authentication (step 1130).

Figure 12A:
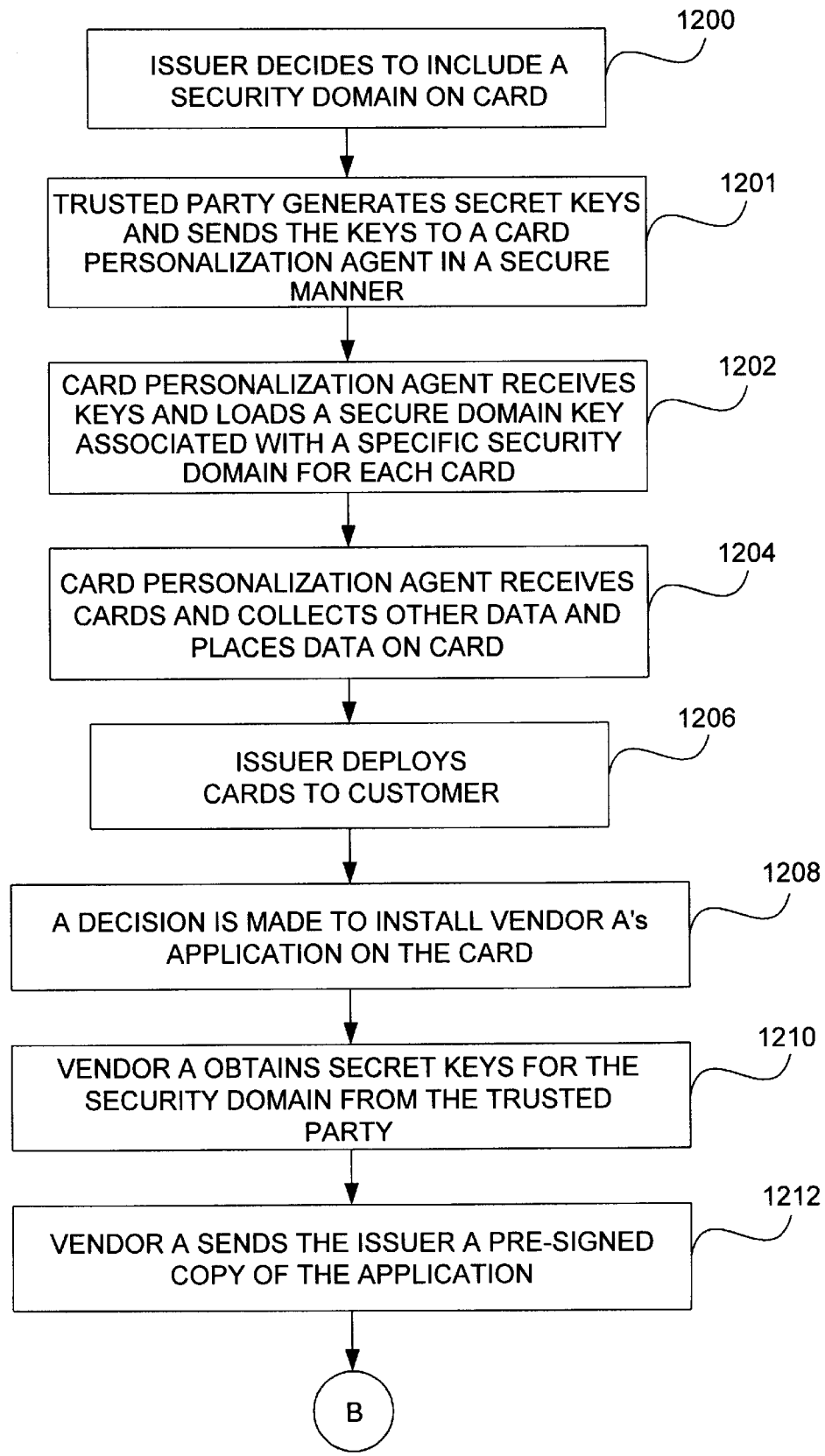
FIGS. 12A–12B are flow diagrams of an example of a method according to an alternate embodiment of the present invention for loading an application using a security domain after the smart card has issued.
Figure 12B:
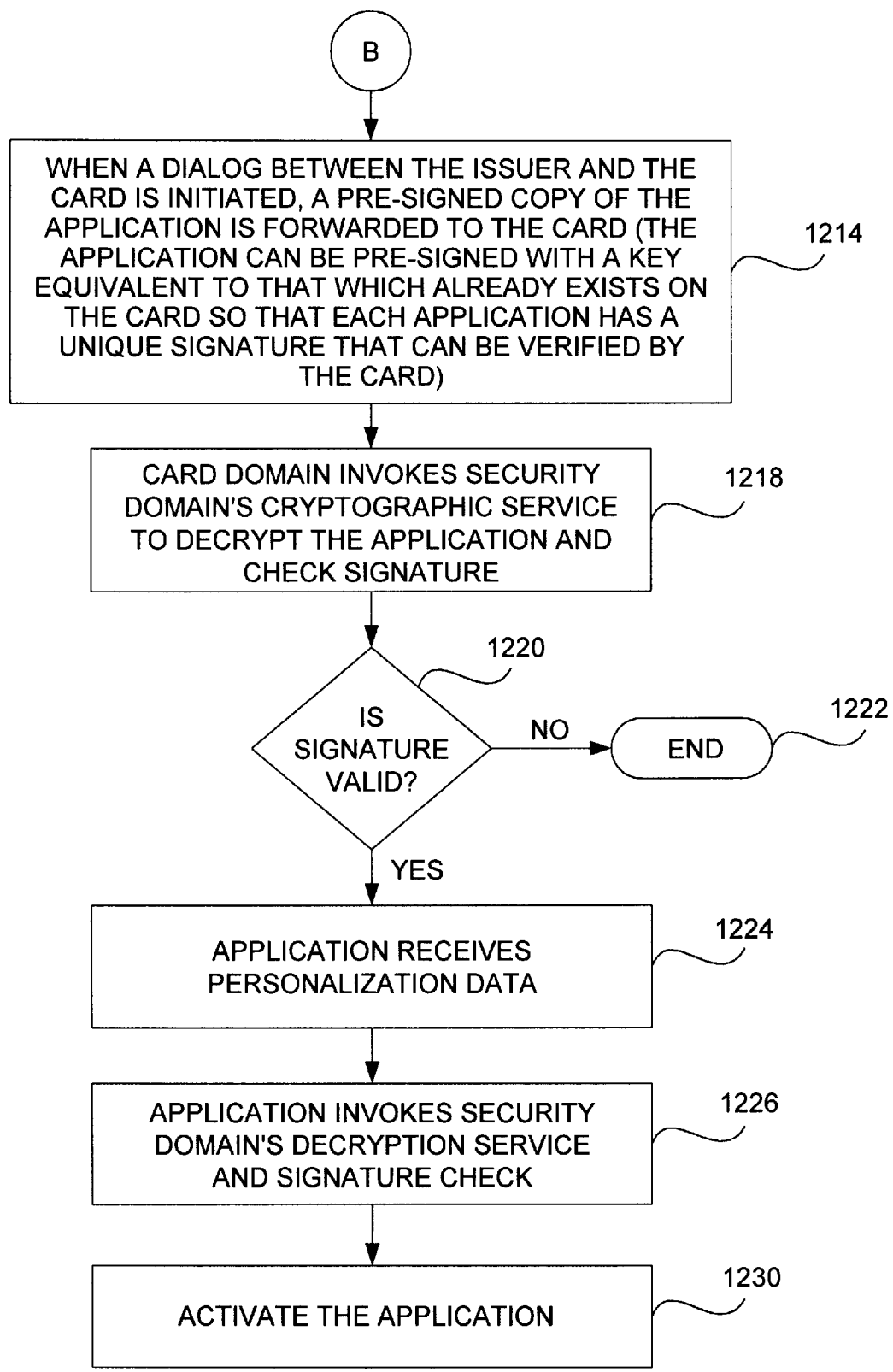

FIGS. 12A and 12B are flow diagrams of a method according to another embodiment of the present invention for providing confidential information to an application using a security domain 310. The issuer decides to include a security domain 310 on a smart card (step 1200). A trusted party generates secret cryptographic keys and sends the keys to a card personalization agent in a secure manner (step 1201). A trusted party is typically a third party who performs the function of certifying the source of information, such as a signature. A card personalization agent (which may be the same as the trusted party) receives the key and loads a unique secure domain key associated with a specific security domain 310 for each smart card (step 1202).

The card personalization agent receives the smart card and collects other data, such as application and card holder specific data, and places the data on the smart card (step 1204). The issuer then deploys the smart card to its customers (step 1206). A decision is made to install vendor A's application on the issued smart card (step 1208). Vendor A obtains secret keys for security domain 310 from the trusted party (step 1210). Vendor A then sends the smart card issuer a signed copy of Vendor A's application (step 1212).

When a dialogue between the smart card issuer and the smart card is initiated, a signed copy of the application is forwarded to the smart card (step 1214). The application can be signed with a key equivalent to that which already exists on the smart card so that each application has a unique signature that can be verified by the smart card. Card domain 308 invokes security domain's cryptographic service to decrypt the associated application and check its signature (step 1218). It is then determined whether the signature is valid (step 1220). If the signature is not valid, then the process ends (step 1222).

If, however, the signature is valid, then the application receives personalization data, which can be signed and optionally encrypted (step 1224). The loaded application then invokes security domain's decryption service and signature check (step 1226). The cryptographic secret data required to run or operate the application on the card are used to activate the application (step 1230).

Figure 13:
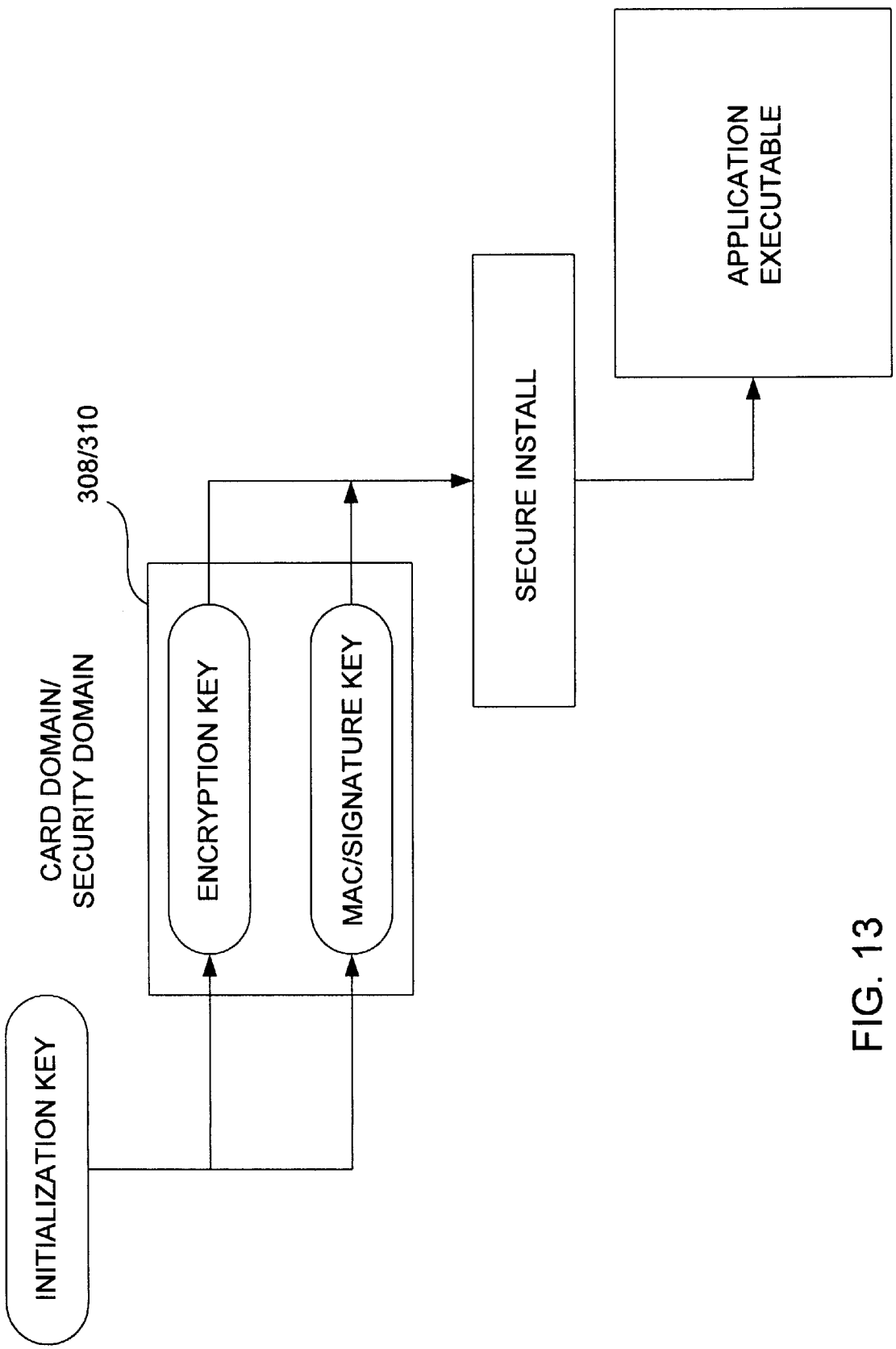
FIG. 13 is a block diagram illustrating an example of key management and key dependencies for post issuance download of applications onto the smart card.

FIG. 13 is a block diagram illustrating the use of cryptographic keys for post issuance loading of an application onto a smart card. Applications that are not masked and not loaded during card initialization stage or personalization stage need their executables downloaded using a secure installation method, such as the post issuance download described in previous Figures. The applications can be loaded using the card domain cryptographic keys. The applications are then decrypted and can have their signature verified using the key services of the corresponding security domain 310. Therefore, the desired security domain(s) 310 preferably have encryption and signature keys installed prior to the post issuance download of the corresponding application.

In the example shown in FIG. 13, only one security domain 310 is shown since security domains 310 for other applications are not relevant to illustrate the downloading of a single application. Note that the result of the secure installation is initially a loaded application, which must then be installed, registered and personalized. After loading, the application is installed, preferably by issuing an install APDU command to card domain 308. An application can be installed when its install method has executed successfully. Memory allocations have been performed by the time an application is in an install state. A loaded application should also be registered. When an application is registered, it is selectable and it is ready to process and respond to APDU commands. Installation and registration may be performed simultaneously by the same APDU command. An application is also personalized after loading. A personalized application includes card holder specific data and other required data which allows the application to run.

In the example shown in FIG. 13, the cryptographic key and MAC/Signature key are shown to be included in the functions of card domain 308/security domain 310. If a security domain is associated with the application being loaded, then the security domain will be invoked. However, if no security domain 310 is associated with the application which is being loaded, then the cryptographic key and the signature key of card domain 308 will be utilized. In contrast to the install commands sent to the smart card during the initialization phase, the post issuance install command is not issued in a secured environment, therefore it is preferably protected with a cryptographic key, such as a MAC/Signature key. Card domain 308 manages the post-issuance loading of a new application, while secure domain 310 ensures the validity and integrity of the new application once the new application has been loaded onto the smart card. If a secure domain 310 is not associated with the newly loaded application, then card domain 308 performs secure domain's 310 functions. Once the new application is post-issuance downloaded, various keys, such as an cryptographic key and a signature key, are preferably utilized for installation and personalization of the application.

A method and system for a smart card domain and a security domain has been disclosed. Software written according to the present invention may be stored in some form of computer-readable medium, such as memory or CD-ROM, or transmitted over a network, and executed by a processor.

Although the present invention has been described in accordance with the embodiment shown, one of ordinary skill in the art will readily recognize that there could be variations to the embodiment and these variations would be within the spirit and scope of the present invention. Accordingly, many modifications may be made by one of ordinary skill in the art without departing from the spirit and scope of the appended claims.

What is claimed is:

1. A smart card comprising:
    a card life cycle having a plurality of states;
    a memory including an indication of which of said states said card life cycle is in; and
    a card domain application including
        an issuer key associated with the issuer of said smart card,
        a function for managing said life cycle of said smart card, and
        a function for tracking the status of said life cycle of said smart card, whereby said card domain application represents the interests of the issuer and manages said card life cycle.

2. A smart card as recited in claim 1 wherein said card domain application further includes:
    a function for blocking said smart card.

3. A smart card as recited in claim 1 wherein said states of said card life cycle include masked, initialized, load secured and blocked.

4. A smart card as recited in claim 1 wherein said states of said card life cycle are in an irreversible sequence and wherein said states of said card life cycle place said smart card into an increasing level of security.

5. A smart card as recited in claim 1 wherein the contents of said memory determines the state of said card life cycle.

6. A method of blocking a smart card comprising:
    detecting a problem with said smart card by an application of said smart card;
    sending a card block request from said application to a card domain application of said smart card, said card domain application having the capability to block said smart card;
    determining by said card domain application whether said card block request is valid; and
    blocking said smart card by said card domain application, whereby said smart card is not operational for a user.

7. A method as recited in claim 6 wherein said card domain application includes an issuer key associated with the issuer of said smart card, whereby said card domain application represents the interests of the issuer.

8. A method of moving a smart card through a sequence of card life cycle states, said method comprising:
    receiving said smart card in a masked state, said masked state indicating that components necessary for initialization are available on said smart card;
    initializing said smart card using an initialization key;
    placing said smart card into an initialized state;
    loading an application onto said smart card post-issuance; and
    placing said smart card into a load secured state, whereby said smart card passes through a number of said states of said card life cycle.

9. A method as recited in claim 8 further comprising:
    receiving a card block request;
    blocking said smart card; and
    placing said smart card into a blocked state, whereby said smart card is not operational for a user.

10. A method as recited in claim 8 wherein said card life cycle states are managed by a card domain application.

11. A method as recited in claim 8 wherein said states of said card life cycle are in an irreversible sequence.

12. A method as recited in claim 8 wherein said states of said card life cycle place said smart card into an increasing level of security.

13. A smart card comprising:
    a first application having a sequence of life cycle states; and
    a card domain application including
        an issuer key associated with the issuer of said smart card,
        a function for loading said application onto said smart card, said loading causing said first application to be placed into a loaded state,
        a function for installing said application on said smart card, said installing causing said first application to be placed into an installed state, and a function for registering said application on said smart card, said registering causing said first application to be placed into a registered state, whereby said card domain application represents the interests of the issuer and manages said first application.

14. A smart card as recited in claim 13 wherein said card domain application further includes:

a cryptographic service for loading said first application onto said smart card post-issuance.

15. A smart card as recited in claim 13 wherein said first application further includes:

a function for personalizing said first application, said personalizing causing said first application to be placed into a personalized state, whereby said personalizing is under the authority of said first application.

16. A smart card as recited in claim 13 wherein said first application further includes:

a function for blocking said first application, said blocking causing said first application to be placed into a blocked state, whereby said blocking is under the authority of said first application.

17. A method of moving an application of smart card through a sequence of application life cycle states, said method comprising:

receiving said application on said smart card, said receiving placing said application into a loaded state;

installing said application on said smart card, said installing placing said application into an installed state;

registering said application on said smart card, said registering placing said application into a registered state;

personalizing said application on said smart card, said personalizing placing said application into a personalized state, whereby said application is available for use.

18. A method as recited in claim 17 further comprising:

receiving an application block request;

blocking said application; and placing said application into a blocked state, whereby said application is not available for use.

19. A method as recited in claim 17 further comprising:

receiving an application delete request;

deleting said application from said smart card; and indicating said application is in a not available state, whereby said application is not available for use.

20. A method as recited in claim 17 wherein said application is received by being loaded into a memory of said smart card during initialization of said smart card, whereby said application is present on said smart card before issuance.

21. A method as recited in claim 17 wherein said application is received by being loaded onto said smart card post-issuance, whereby said application appears on said smart card after issuance.

22. A method of moving an application of smart card through a sequence of application life cycle states after issuance of said smart card, said method comprising:

issuing said smart card;

indicating within said smart card that said application is in a not available state;

loading said application onto said smart card post-issuance, said loading placing said application into a loaded state; and installing said application on said smart card, said installing placing said application into an installed state, whereby said application is available for use on said smart card.

23. A method as recited in claim 22 further comprising:

personalizing said application on said smart card, said personalizing placing said application into a personalized state.

\* \* \* \* \*